(12) United States Patent
Takakura

(10) Patent No.: US 10,900,936 B2
(45) Date of Patent: Jan. 26, 2021

(54) GAS CHROMATOGRAPH AND SAMPLE INJECTION METHOD

(71) Applicant: Shimadzu Corporation, Kyoto (JP)

(72) Inventor: Masato Takakura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 284 days.

(21) Appl. No.: 15/771,255

(22) PCT Filed: Oct. 28, 2015

(86) PCT No.: PCT/JP2015/080462
§ 371 (c)(1),
(2) Date: Apr. 27, 2018

(87) PCT Pub. No.: WO2017/072893
PCT Pub. Date: May 4, 2017

(65) Prior Publication Data
US 2018/0313793 A1    Nov. 1, 2018

(51) Int. Cl.
*G01N 30/12*  (2006.01)
*G01N 30/04*  (2006.01)
*G01N 30/06*  (2006.01)
*G01N 30/88*  (2006.01)
*G01N 30/16*  (2006.01)
G01N 30/02  (2006.01)

(52) U.S. Cl.
CPC ............ *G01N 30/12* (2013.01); *G01N 30/04* (2013.01); *G01N 30/06* (2013.01); *G01N 30/16* (2013.01); *G01N 30/88* (2013.01); *G01N 2030/025* (2013.01)

(58) Field of Classification Search
None
See application file for complete search history.

(56) References Cited

U.S. PATENT DOCUMENTS

| 3,247,704 | A | * | 4/1966 | Konig | G01N 30/18 |
| | | | | | 73/23.41 |
| 5,686,656 | A | * | 11/1997 | Amirav | G01N 30/12 |
| | | | | | 73/23.41 |
| 7,818,994 | B2 | * | 10/2010 | Munari | G01N 30/12 |
| | | | | | 73/23.41 |

FOREIGN PATENT DOCUMENTS

WO    2005/116627 A1    12/2005

OTHER PUBLICATIONS

Ken Lynam, "High-Speed Analysis of Organophosphorus Residual Pesticides in Olive Oil", Agilent Technologies Inc., Jun. 2011, pp. 1-9.

(Continued)

*Primary Examiner* — Jill E Culler
(74) *Attorney, Agent, or Firm* — Sughrue Mion, PLLC

(57) ABSTRACT

A sample solution (21) that is a first solvent containing a sample is stored in a first storage section (17). A pseudo matrix solution (22) that is a second solvent, with higher polarity than the first solvent, in which a pseudo matrix is dissolved is stored in a second storage section (18). A suction control unit (191) causes the sample solution (21) in the first storage section (17) and the pseudo matrix solution (22) in the second storage section (18) to be sucked into a syringe (15). An injection control unit (192) causes the sample solution (21) and the pseudo matrix solution (22) to be vaporized in a sample vaporization chamber (12), by causing the sample solution (21) and the pseudo matrix solution (22) sucked into the syringe (15) to be injected into the sample vaporization chamber (12).

2 Claims, 13 Drawing Sheets

(56) References Cited

OTHER PUBLICATIONS

"Automation of Addition of Internal Standard Solution", LCtalk No. 80, Jul. 2011, pp. 1-6.
Michelangelo Anastassiades, et al., "Evaluation of analyte protectants to improve gas chromatographic analysis of pesticides", Journal of Chromatography A, 2003, pp. 163-184, vol. 1015.
International Search Report for PCT/JP2015/080462 dated Dec. 28, 2015 [PCT/ISA/210].
Communication dated Jul. 1, 2019, from the European Patent Office in counterpart European Application No. 15907257.8.
Doris Smith, et al., "Organophosphorous Residues in Olive Oil by GC/FPD with Agilent J&W DB-35ms Ultra Inert", Agilent Technologies, Apr. 21, 2011, pp. 1-10 (10 pages total).

\* cited by examiner delta - BHC

243 COMPONENTS AMONG
TOTAL OF 268 COMPONENTS

GAS CHROMATOGRAPH AND SAMPLE INJECTION METHOD

TECHNICAL FIELD

The present invention relates to a gas chromatograph and a sample injection method for injecting a sample from a syringe into a sample vaporization chamber connected to a column, and thereby introducing a sample which is vaporized in the sample vaporization chamber into the column.

BACKGROUND ART

Gas chromatographs (including gas chromatograph mass spectrometers) are sometimes used at the time of performing an analysis of pesticide residues in food as a sample. This type of sample contains foreign components (matrices) in addition to an analysis target substance, and when a quantitative analysis is performed on such a sample, a quantitative value different from the actual value is possibly obtained. One of the reasons is that active sites such as silanol groups present in an analysis system, such as a column, become bound to the matrices.

For example, in the case where hardly any matrix is present in a sample, such as in the case of a standard sample, a part of an analysis target substance in the sample is bound to the active site and cannot reach a detector. Therefore, the larger the number of active sites, the less analysis target substance is detected, and a peak intensity of the analysis target substance is reduced. On the other hand, an actual sample (test sample) contains matrices, and thus, the matrices are preferentially bound to the active sites than an analysis target component, and the amount of analysis target component that is bound to the active sites is reduced. In this case, the peak intensity of the analysis target substance is not reduced.

In this manner, the peak intensity of an analysis target substance to be detected by a detector is changed depending on whether matrices are present in the sample or not. Accordingly, if a calibration curve is generated by using a standard sample with a small number of matrices, and a test sample containing a large number of matrices is quantitatively analyzed, a quantitative value which is greatly different from the actual value is obtained. Such a phenomenon is called a matrix effect, and often occurs in analysis of a sample containing a large number of matrices, such as analysis of pesticide residues in food, and is considered a problem particularly in a field where regulatory values are set.

As a method for preventing a problem regarding a quantitative value which is caused by the matrix effect as described above, a method of using a pseudo matrix (analytical protectant) as described in Non-Patent Document 1 is known. Specifically, a pseudo matrix such as gulonolactone is added to a sample solution. When a pseudo matrix is added to a sample solution, the pseudo matrix is bound to the active site, and thus, the peak intensity of an analysis target substance to be detected by a detector may be prevented from being changed between a sample not containing a matrix and a sample containing a matrix. Accordingly, by generating a calibration curve by adding a pseudo matrix to a sample solution of a standard sample, an accurate quantitative value can be calculated even in the case of quantitatively analyzing a test sample containing a matrix.

PRIOR ART DOCUMENTS

Non-Patent Documents

Non-Patent Document 1: M. Anastassiades, K. Mastovska, S. J. Lehotay, "Evaluation of analyte protectants to improve gas chromatographic analysis of pesticides" Journal of Chromatography A, 1015 (2003) 163-184

SUMMARY OF THE INVENTION

Problems to be Solved by the Invention

However, a pseudo matrix such as gulonolactone is preferably a substance which is more easily bound to an active site of an analysis system than an analysis target component, and generally, has a high boiling point and high polarity, and is thus easily soluble in a solvent which also has high polarity, but is not easily soluble in a solvent which has low polarity. For example, in the case of performing analysis taking pesticide residues in food as a sample, a mixed liquid of acetone and hexane is mainly used as the solvent for the test sample, but such a solvent has low polarity, and there is a problem that, if a pseudo matrix with high polarity is added, the pseudo matrix is not evenly dissolved.

Accordingly, when a sample solution is sucked in by a syringe from a container containing the sample solution after addition of a pseudo matrix in the container, a sample solution in which the pseudo matrix is evenly dissolved cannot be sucked. As a result, the amount of pseudo matrix in the sucked sample solution does not become constant, and an accurate quantitative value is possibly not calculated.

Particularly, a gas chromatograph performs analysis by vaporizing a test sample, and thus, a solvent with low polarity and a low boiling point is used as the solvent for the test sample. However, the pseudo matrix is a high-boiling compound and has high polarity, and is not easily dissolved in a solvent with low polarity for the test sample. In this manner, with a conventional method, the solvent for the test sample becomes a constraint condition, and accurate quantitative analysis using a pseudo matrix is difficult.

The present invention has been made in view of the above circumstances, and has its object to provide a gas chromatograph and a sample injection method which are capable of performing accurate quantitative analysis using a pseudo matrix.

Means for Solving the Problems (1) A gas chromatograph according to the present invention is a gas chromatograph for injecting a sample from a syringe into a sample vaporization chamber connected to a column and introducing a sample vaporized in the sample vaporization chamber into the column, and includes a first storage section, a second storage section, a suction control unit, and an injection control unit. The first storage section stores a sample solution that is a first solvent containing a sample. The second storage section stores a pseudo matrix solution that is a second solvent, with higher polarity than the first solvent, in which a pseudo matrix is dissolved. The suction control unit causes the sample solution in the first storage section and the pseudo matrix solution in the second storage section to be sucked into the syringe. The injection control unit causes the sample solution and the pseudo matrix solution to be vaporized in the sample vaporization chamber, by causing the sample solution and the pseudo matrix solution sucked into the syringe to be injected into the sample vaporization chamber.

According to such a configuration, the sample solution and the pseudo matrix solution are injected and vaporized in the sample vaporization chamber after being sucked into the same syringe. That is, the sample solution and the pseudo matrix solution are not sucked into the syringe by being mixed in advance, but instead, each solution is sucked into the syringe by a set amount.

Accordingly, even in a case where the pseudo matrix is not easily dissolved in the sample solution, a case where the amount of pseudo matrix in the sucked sample solution is not constant, as in a case where suction is performed with the pseudo matrix mixed in advance in the sample solution, may be prevented. As a result, a matrix effect may be effectively reduced by using the pseudo matrix, and quantitative analysis may be accurately performed.

Furthermore, operation at the time of analysis may be simplified, compared to a configuration where an operation of sucking in the sample solution from the first storage section and injecting the sample solution into the sample vaporization chamber, and an operation of sucking in the pseudo matrix solution from the second storage section and injecting the pseudo matrix solution into the sample vaporization chamber are separately performed.

Furthermore, the burden of preparing reagent may be reduced, compared to a case of adding the pseudo matrix in the sample solution.

(2) The suction control unit may cause the pseudo matrix solution in the second storage section to be sucked into the syringe, after causing the sample solution in the first storage section to be sucked into the syringe.

According to such a configuration, of the sample solution and the pseudo matrix solution sucked into the syringe, the pseudo matrix solution is injected into the sample vaporization chamber before the sample solution. Accordingly, the pseudo matrix is vaporized and is bound to an active site before the analysis target substance, and thus, an analysis target component, which is vaporized later, is less likely to be bound to the active site. As a result, the peak intensity of the analysis target substance may be effectively prevented from being reduced, and thus, quantitative analysis may be even more accurately performed. Moreover, in the case of avoiding an influence of discrimination (according to which high-boiling components in a measurement target remain in the syringe, causing a ratio of components introduced into the column to be different from a ratio of components of the sample sucked into the syringe), the suction control unit may cause the sample solution in the first storage section to be sucked into the syringe, after causing the pseudo matrix solution in the second storage section to be sucked into the syringe.

(3) The injection control unit may cause the sample solution in the syringe to be injected into the sample vaporization chamber after a lapse of a certain period of time after causing the pseudo matrix solution in the syringe to be injected into the sample vaporization chamber.

According to such a configuration, the sample solution and the pseudo matrix solution sucked into the syringe may be separately injected into the sample vaporization chamber. Accordingly, an analysis target substance is vaporized and introduced into the column after the pseudo matrix is vaporized and is sufficiently bound to the active site, and thus, an analysis target component may be effectively prevented from getting bound to the active site, and quantitative analysis may be even more accurately performed.

(4) A sample injection method according to the present invention is a sample injection method for injecting a sample from a syringe into a sample vaporization chamber connected to a column, and includes a suction step and an injection step. In the suction step, a sample solution that is a first solvent containing a sample and a pseudo matrix solution that is a second solvent, with higher polarity than the first solvent, in which a pseudo matrix is dissolved are sucked into the syringe. In the injection step, the sample solution and the pseudo matrix solution are caused to be vaporized in the sample vaporization chamber, by the sample solution and the pseudo matrix solution sucked into the syringe being injected into the sample vaporization chamber.

(5) In the suction step, the pseudo matrix solution in the second storage section may be sucked into the syringe, after the sample solution in the first storage section is sucked into the syringe.

(6) In the injection step, the sample solution in the syringe may be injected into the sample vaporization chamber after a lapse of a certain period of time after the pseudo matrix solution in the syringe is injected into the sample vaporization chamber.

Effects of the Invention

According to the present invention, even in a case where a pseudo matrix is not easily dissolved in a sample solution, a case where the amount of pseudo matrix in a sucked sample solution is not constant, as in a case where suction is performed with a sample solution and a pseudo matrix solution mixed in advance, may be prevented, and thus, a matrix effect may be effectively reduced by using the pseudo matrix, and quantitative analysis may be accurately performed. Furthermore, accurate quantitative analysis may be performed using a pseudo matrix with high polarity regardless of which solvent is used as the solvent for a test sample.

MODE FOR CARRYING OUT THE INVENTION

Figure 1:
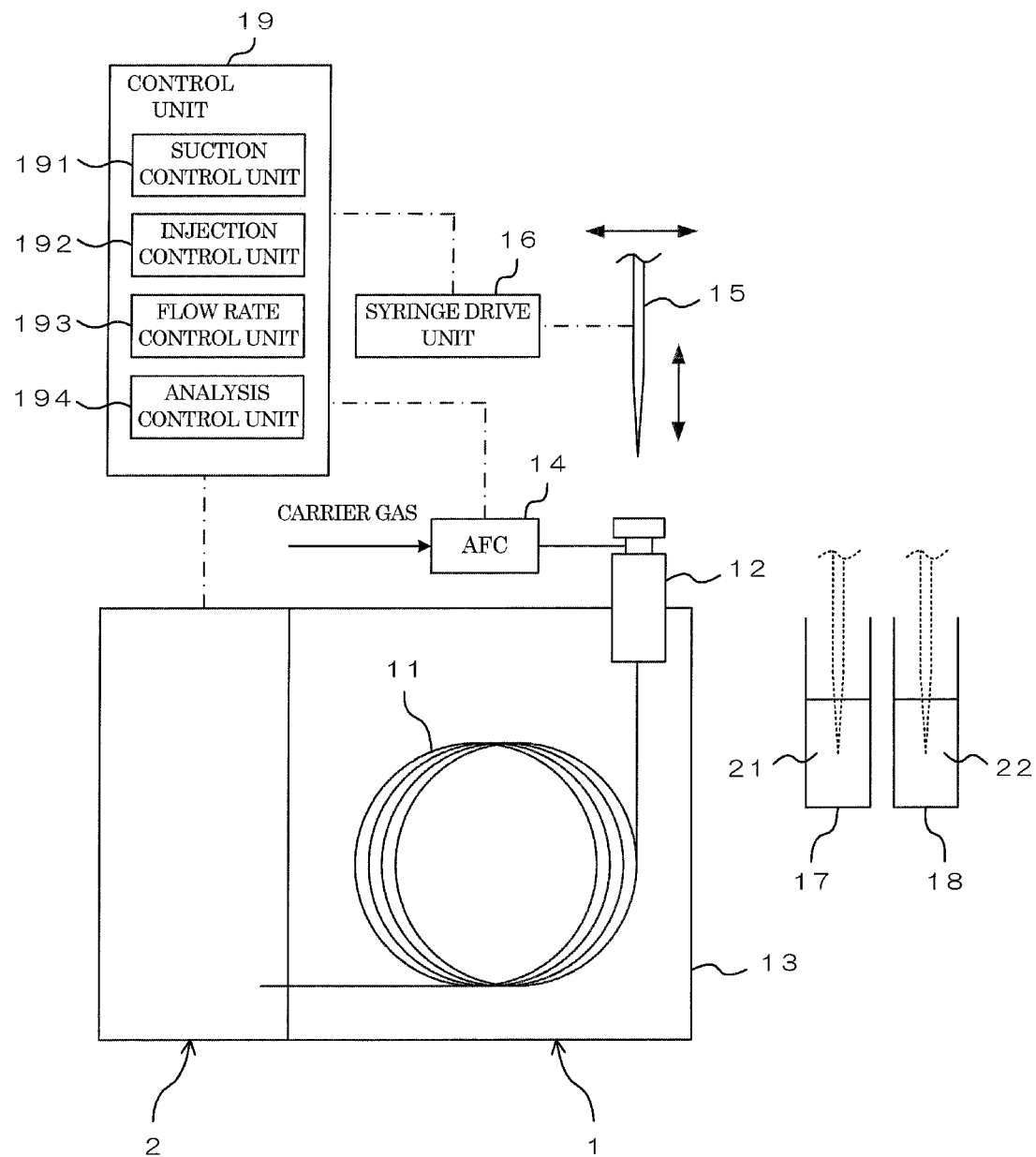
FIG. 1 is a schematic diagram showing an example configuration of a gas chromatograph according to a first embodiment of the present invention.

FIG. 1 is a schematic diagram showing an example configuration of a gas chromatograph according to a first embodiment of the present invention. The gas chromatograph is a gas chromatograph mass spectrometer (GC/MS) including a gas chromatograph unit (GC unit 1) and a mass spectrometer unit (MS unit 2).

For example, the GC unit 1 includes a column 11, a sample vaporization chamber 12, a column oven 13, an advanced flow controller (AFC) 14, a syringe 15, a syringe drive unit 16, a first storage section 17, a second storage section 18, and a control unit 19. An upstream end of the column 11 is connected to the sample vaporization chamber 12, and a downstream end of the column 11 is connected to the MS unit 2.

The column 11 is housed in the column oven 13, together with a heater, a fan and the like (which are not shown). The column oven 13 is for heating the column 11, and, by driving the heater and the fan as appropriate at the time of analysis, isothermal analysis according to which an analysis is performed while maintaining a constant temperature inside the column oven 13, or programmed temperature analysis according to which an analysis is performed while gradually increasing the temperature inside the column oven 13 may be performed.

A carrier gas is supplied to the column 11 via the AFC 14. For example, an He gas is used as the carrier gas. At the time of analysis, a sample is injected into the sample vaporization chamber 12 from the syringe 15, the sample is vaporized in the sample vaporization chamber 12, and the vaporized sample is introduced into the column 11 together with the carrier gas. At the GC unit 1, sample components are separated when the carrier gas passes through the column 11, and are sequentially guided to the MS unit 2 as a detector.

For example, the MS unit 2 includes an ionization chamber, a mass filter, and an ion detector (which are not shown). During analysis, each sample component separated at the column 11 is guided to the ionization chamber to be ionized. Then, mass spectrometry may be performed by separating each ionized sample component according to m/z by the mass filter in a vacuum chamber and by detecting the sample component by the ion detector.

In the present embodiment, as the solution to be injected from the syringe 15 into the sample vaporization chamber 12, a sample solution 21 containing an analysis target component, and a pseudo matrix solution 22 in which a pseudo matrix is dissolved are used. The sample solution 21 is stored in the first storage section 17. The pseudo matrix solution 22 is stored in the second storage section 18 different from the first storage section 17.

The sample solution 21 is a solution containing an analysis target component in a solvent (first solvent). As this solvent, a mixed liquid of acetone and hexane is used, for example, and a mixing ratio (volume ratio) is 1:1. Such a solvent is characteristic in that a boiling point is low and polarity is low. However, the solvent for a sample is not limited to the mixed liquid of acetone and hexane, and the mixing ratio is not limited to the value mentioned above, as long as the solvent has a low boiling point and low polarity. The sample solution may be obtained by dissolving, in the solvent, a standard sample of an analysis target component not containing a matrix (foreign components), or may be obtained by performing preprocessing such as solvent extraction on an actual sample (test sample) containing a matrix.

The pseudo matrix solution 22 is a solution that is obtained by dissolving a pseudo matrix in a solvent (second solvent). As this solvent, a mixed liquid of acetonitrile and water is used, for example, and a mixing ratio (volume ratio) is set according to the type of the pseudo matrix. Such a solvent is characteristic in that a boiling point is higher and polarity is higher than the solvent for a sample. However, the solvent in which the pseudo matrix is dissolved is not limited to the mixed liquid of acetonitrile and water, as long as the solvent has a high boiling point and high polarity. The pseudo matrix to be dissolved in the solvent is an analytical protectant containing galanolactone, sorbitol, or ethylglycerol, for example, and is a high-boiling compound with high polarity.

The syringe drive unit 16 includes a motor, for example, and is capable of moving the syringe 15 in a vertical direction and a horizontal direction, and of causing a solution to be sucked into the syringe 15 or a solution in the syringe 15 to be discharged. By being driven by the syringe drive unit 16, a tip end portion of the syringe 15 may be selectively inserted into the first storage section 17 or the second storage section 18, and the sample solution 21 in the first storage section 17 or the pseudo matrix solution 22 in the second storage section 18 may be sucked into the syringe 15. Moreover, after suction, the tip end of the syringe 15 may be inserted into the sample vaporization chamber 12 by being driven by the syringe drive unit 16, and the solution in the syringe 15 may be injected into the sample vaporization chamber 12.

The control unit 19 includes a central processing unit (CPU), for example, and functions as a suction control unit 191, an injection control unit 192, a flow rate control unit 193, an analysis control unit 194, and the like by the CPU executing programs. The control unit 19 is electrically connected to each unit such as the MS unit 2, the AFC 14, and the syringe drive unit 16.

The suction control unit 191 controls the syringe drive unit 16 to thereby cause a solution to be sucked into the syringe 15. Specifically, the syringe drive unit 16 is controlled such that a suction operation of the sample solution 21 from the first storage section 17 and a suction operation of the pseudo matrix solution 22 from the second storage section 18 are performed without a discharge operation being performed between the suction operations, and the sample solution 21 and the pseudo matrix solution 22 are thus sucked into the syringe 15.

The injection control unit 192 controls the syringe drive unit 16 to thereby cause the solution in the syringe 15 to be injected into the sample vaporization chamber 12. Specifically, the tip end portion of the syringe 15 where the sample solution 21 and the pseudo matrix solution 22 are sucked in is inserted into the sample vaporization chamber 12, and the sample solution 21 and the pseudo matrix solution 22 in the syringe 15 are injected into the sample vaporization chamber 12 by one discharge operation.

The flow rate control unit 193 controls the AFC 14 to thereby cause a carrier gas to be supplied into the sample vaporization chamber 12 at a flow rate according to set analysis conditions. The analysis control unit 194 controls mass separation at the MS unit 2, and generates a chromatogram or a spectrum based on an obtained detection signal.

Figure 2:
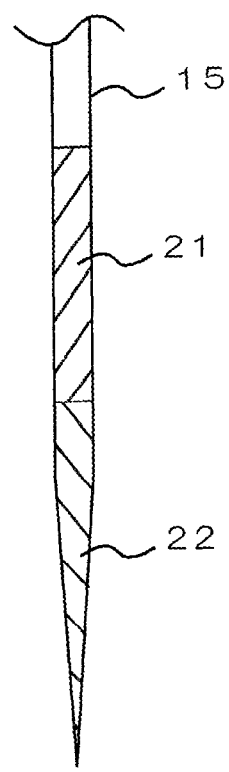
FIG. 2 is a schematic diagram showing a state where a solution is sucked in a syringe.

FIG. 2 is a schematic diagram showing a state where a solution is sucked in the syringe 15. As shown in FIG. 2, at the time of suction of a solution into the syringe 15, the sample solution 21 in the first storage section 17 is first sucked in, and then, the pseudo matrix solution 22 in the second storage section 18 is sucked in.

The sample solution 21 and the pseudo matrix solution 22 are each sucked into the syringe 15 by a predetermined amount. For example, an amount of suction is 1 µL for each of the sample solution 21 and the pseudo matrix solution 22, but this is not restrictive, and the amount of the pseudo matrix solution 22 is preferably as small as possible, such as 0.2 µL to 0.4 µL.

A suction operation or a discharge operation is not performed between suction of the sample solution 21 and suction of the pseudo matrix solution 22, and the sample solution 21 and the pseudo matrix solution 22 are sucked into the syringe 15 to be adjacent to each other without an air layer between the solutions.

In a case where, unlike in the example in FIG. 2, air is sucked in after suction of the sample solution 21 and then the pseudo matrix solution 22 is sucked in, an air layer is sandwiched between the sample solution 21 and the pseudo matrix solution 22. In this case, at the time of suction of the pseudo matrix solution 22, depending on the type of a solvent for the pseudo matrix solution 22, an accurate amount of pseudo matrix solution 22 may not be sucked in, due to the influence of the air layer in the syringe 15, and the amount of suction of the pseudo matrix solution 22 may become small. In such a case, the air layer is caused not to exist between the sample solution 21 and the pseudo matrix solution 22, as in the example in FIG. 2.

Figure 3:
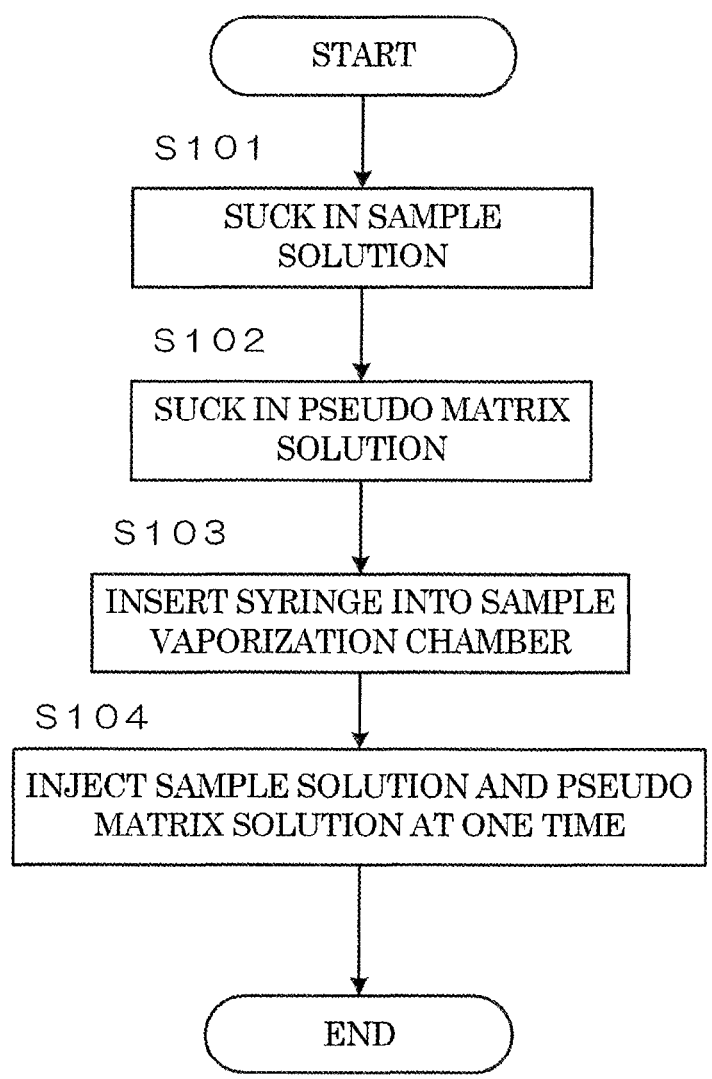
FIG. 3 is a flowchart showing an example of processing by a control unit for a suction operation and a discharge operation of the syringe.

FIG. 3 is a flowchart showing an example of processing by the control unit 19 for a suction operation and a discharge operation of the syringe 15. As shown in FIG. 3, at the time of a suction operation, the sample solution 21 in the first storage section 17 is first sucked in, and then, the pseudo matrix solution 22 in the second storage section 18 is sucked in (steps S101, S102: suction step).

Then, the tip end portion of the syringe 15 is inserted into the sample vaporization chamber 12 (step S103), and the sample solution 21 and the pseudo matrix solution 22 in the syringe 15 are injected into the sample vaporization chamber 12 at one time (step S104: injection step). The sample solution 21 and the pseudo matrix solution 22 are thereby vaporized in the sample vaporization chamber 12, and are introduced into the column 11.

As described above, in the present embodiment, after being sucked into the same syringe 15, the sample solution 21 and the pseudo matrix solution 22 are injected and vaporized in the sample vaporization chamber 12. That is, the sample solution 21 and the pseudo matrix solution 22 are not sucked into the syringe 15 by being mixed in advance, but instead, each solution is sucked into the syringe 15 by a set amount.

Accordingly, even in a case where the pseudo matrix is not easily dissolved in the sample solution 21, a case where the amount of pseudo matrix in the sucked sample solution 21 is not constant, as in a case where suction is performed with the pseudo matrix mixed in advance in the sample solution 21, may be prevented. As a result, a matrix effect may be effectively reduced by using the pseudo matrix, and quantitative analysis may be accurately performed.

Furthermore, operation at the time of analysis may be simplified, compared to a configuration where an operation of sucking in the sample solution 21 from the first storage section 17 and injecting the sample solution 21 into the sample vaporization chamber 12, and an operation of sucking in the pseudo matrix solution 22 from the second storage section 18 and injecting the pseudo matrix solution 22 into the sample vaporization chamber 12 are separately performed.

Particularly, in the present embodiment, of the sample solution 21 and the pseudo matrix solution 22 sucked into the syringe 15, the pseudo matrix solution 22 is injected into the sample vaporization chamber 12 before the sample solution 21. Accordingly, the pseudo matrix is vaporized and is bound to an active site before the analysis target substance, and thus, an analysis target component, which is vaporized later, is less likely to be bound to the active site. As a result, the peak intensity of the analysis target substance may be effectively prevented from being reduced, and thus, quantitative analysis may be even more accurately performed.

Figure 4A:
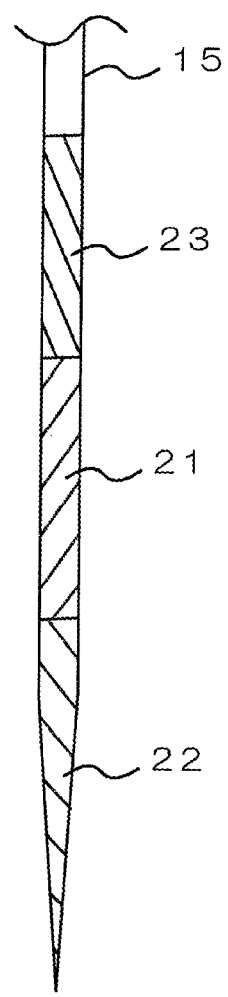
FIG. 4A is a schematic diagram showing a first modification of a mode of suction of a solution into the syringe.

FIG. 4A is a schematic diagram showing a first modification of a mode of suction of a solution into the syringe 15. In the example in FIG. 4A, a solution 23 different from the sample solution 21 and the pseudo matrix solution 22 is further sucked into the syringe 15. For example, in the case where a solution containing an internal standard substance is used as the solution 23, a quantitative value may be simultaneously corrected by an internal standard method, and in the case where a solvent for cleaning is used, an analysis target component or a pseudo matrix component may be prevented from remaining inside the syringe 15, and the components in the syringe 15 may be introduced into the column 11.

For example, a different type of solvent from the solvents for the sample solution 21 and the pseudo matrix solution 22 may be cited as the solution 23. Furthermore, in the case where the sample solution 21 is a solution for a test sample, the solution 23 may be for a standard sample, for example. In this manner, one or more types of solutions 23 different from the sample solution 21 and the pseudo matrix solution 22 may be sucked into the syringe 15. In this case, an order of the solutions 21, 22, 23 sucked into the syringe 15 is not limited to an order illustrated in FIG. 4A.

Figure 4B:
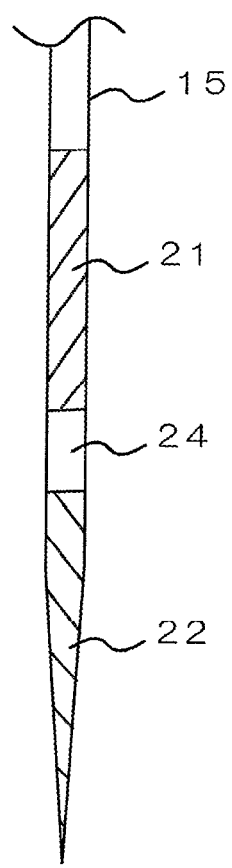
FIG. 4B is a schematic diagram showing a second modification of a mode of suction of a solution into the syringe.

FIG. 4B is a schematic diagram showing a second modification of a mode of suction of a solution into the syringe 15. In the example in FIG. 4B, an air layer 24 is sandwiched between the sample solution 21 and the pseudo matrix solution 22.

As described above, in a case where the air layer 24 is sandwiched between the sample solution 21 and the pseudo matrix solution 22, depending on the type of solvent for a solution, the amount of suction of a solution to be sucked in later is possibly reduced due to the influence of the air layer 24. In this case, the pseudo matrix solution 22 is desirably sucked in after air is sucked into the syringe 15, as shown in FIG. 4B. Accordingly, even if the amount of suction of a solution to be sucked in later is not accurate due to the influence of the air layer 24 in the syringe 15, the amount of suction of the sample solution 21 which is sucked in first is accurate, and an analysis result may be prevented from being greatly affected.

Figure 4C:
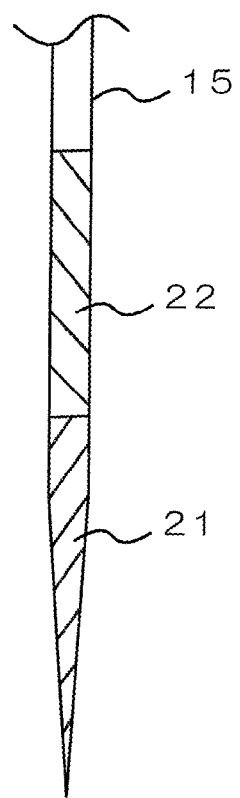
FIG. 4C is a schematic diagram showing a third modification of a mode of suction of a solution into the syringe.

FIG. 4C is a schematic diagram showing a third modification of a mode of suction of a solution into the syringe 15. In the example in FIG. 4C, the pseudo matrix solution 22 is sucked into the syringe 15, and then, the sample solution 21 is sucked in, without an air layer being sandwiched between the solutions. Accordingly, the amount of suction of the sample solution 21 which is sucked in later may be prevented from becoming inaccurate due to the influence of the air layer. Furthermore, because the sample solution 21 does not remain in the syringe 15 after being discharged from the syringe 15, an influence of discrimination may be reduced.

Figure 5:
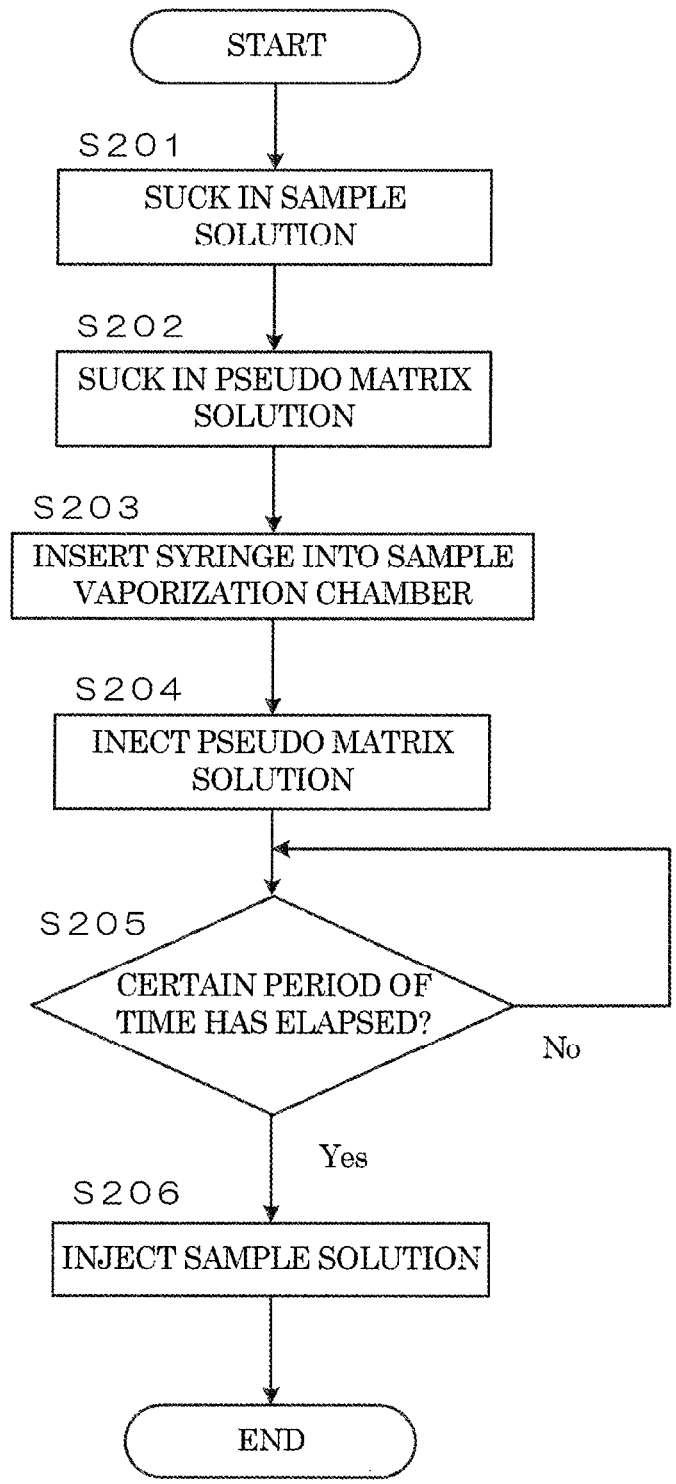
FIG. 5 is a flowchart showing an example of processing by a control unit for a suction operation and a discharge operation of a syringe performed by a gas chromatograph according to a second embodiment of the present invention.

FIG. 5 is a flowchart showing an example of processing by the control unit 19 for a suction operation and a discharge operation of the syringe 15 performed by a gas chromatograph according to a second embodiment of the present invention. In the present embodiment, at the time of a suction operation, first, the sample solution 21 in the first storage section 17 is sucked in, and then, the pseudo matrix solution 22 in the second storage section 18 is sucked in (steps S201, S202: suction step).

Then, the tip end portion of the syringe 15 is inserted into the sample vaporization chamber 12 (step S203), and only the pseudo matrix solution 22 in the syringe 15 is injected first into the sample vaporization chamber 12 (step S204). Then, after a lapse of a certain period of time (step S205: Yes), the sample solution 21 in the syringe 15 is injected into the sample vaporization chamber 12 (step S206).

Accordingly, the pseudo matrix solution 22 and the sample solution 21 are vaporized in the sample vaporization chamber 12 in this order, and are sequentially introduced into the column 11. The certain period of time mentioned above may be a period of time set in advance, or may be arbitrarily set by an operator. Steps S204 to S206 are an injection step.

In this manner, in the present embodiment, the sample solution 21 and the pseudo matrix solution 22 sucked into the syringe 15 may be separately injected into the sample vaporization chamber 12. Accordingly, an analysis target substance is vaporized and introduced into the column 11 after the pseudo matrix is vaporized and is sufficiently bound to the active site, and thus, an analysis target component may be effectively prevented from getting bound to the active site, and quantitative analysis may be even more accurately performed.

The embodiments described above describe cases where the present invention is applied to a gas chromatograph mass spectrometer (GC/MS). However, the present invention may also be applied to a gas chromatograph which does not include the MS unit 2, and which detects a sample component by a different detector.

In the following, a result of an effect confirmation test for the present invention will be described. In this test, spinach was used as a test sample. As the solvent for the test sample, a solvent mixing acetone and hexane at a volume ratio of 1:1 was used, and was prepared by QuEChERS method. An added concentration was 0.01 mg/kg, and pesticides as the analysis target substances were 268 components. The pseudo matrix was gulonolactone, 3-ethoxy-1,2-propanediol, sorbitol.

As the gas chromatograph, GCMS-TQ8040 (gas chromatograph mass spectrometer) manufactured by Shimadzu Corporation was used. As the autosampler, AOC-20i/s manufactured by Shimadzu Corporation was used, and injection was performed in a mode of injecting a sample and a solvent. The column was RxiR-5Sil MS (L=30 m, 0.25 mm I.D., df=0.25 μm) of Restek Corporation, the precolumn was Deactivated Fused Silica Tubing (L=2 m, 0.32 mm I.D.) of SGE Analytical Science, and the insert was Sky Liner, Splitless Single Taper Gooseneck w/Wool of Restek Corporation.

Analysis conditions at the GC unit were as follows.
Injection Port Temperature: 250° C.
Column Oven Temperature: 50° C. (1 min)-(25° C./min)-125° C.-(10° C./min)-300° C.-(15° C./min)
Injection Method: Splitless (high-pressure injection 250 kPa, 1.5 min)
Carrier Gas Control: Linear velocity (47.2 cm/sec)
Injection Amount: 1 μL (pseudo matrix solution injection amount 1 μL)

Analysis conditions at the MS unit were as follows.
Ion Source Temperature: 200° C.
Interface Temperature: 250° C.
Measurement Mode: MRM
Event Time: 0.3 seconds
Loop Time: 0.3 seconds (1) Relationship Between Amount of Injection and Peak Area Value A volume of an injected pesticide standard sample was changed in the manner of 0.4 μL, 0.6 μL, 0.8 μL, 1.0 μL, and whether or not there was a proportional relation to the peak area value was checked. The pseudo matrix solution injected into the sample vaporization chamber at the same time as the pesticide standard sample was 1.0 μL.

Figure 6:
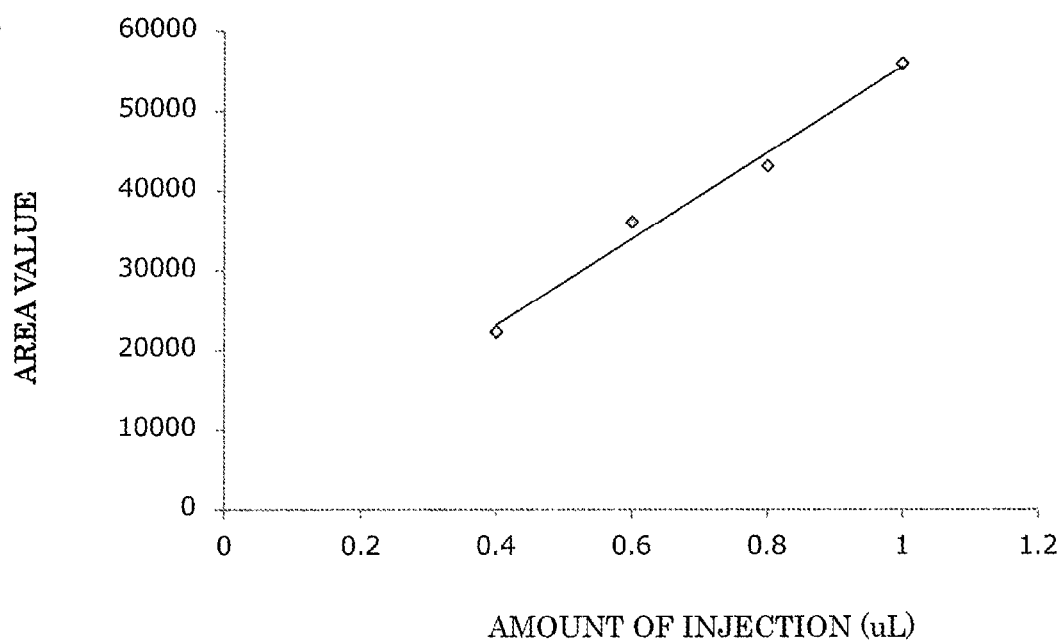
FIG. 6 is a diagram showing a relationship between an amount of injection of a pesticide standard sample and a peak area value.

As a result, the relationship as shown in FIG. 6 was obtained for the amount of injection of the pesticide standard sample and the peak area value, and a proportional relationship was confirmed. From this result, it was confirmed that no overflow from the sample vaporization chamber is caused even when a total of 2.0 μL of the pesticide standard sample and the pseudo matrix solution, 1.0 μL each, is injected.

(2) Comparison of Peak Area Values Between Case of Injection of Only Pesticide Standard Sample and Case of Simultaneous Injection of Pseudo Matrix Solution Peak area values for a case where only a pesticide standard sample was injected and a case where the pseudo matrix solution was simultaneously injected are as shown in Table 1 below, where the pesticide standard sample was phosalone, which is a pesticide that is easily absorbed in the sample vaporization chamber, carbaryl, which is a pesticide a peak of which is easily tailed depending on the state of the column, or delta-BHC, which is a pesticide which is not susceptible to the matrix effect.

TABLE 1

| Component Name | Concentration | Area Value | |
| --- | --- | --- | --- |
| | | Injection of Only Standard Sample | Simultaneous Injection |
| Phosalone | 1 ppb | 9518 | 24611 |
| Carbaryl | 5 ppb | 110951 | 251378 |
| delta - BHC | 1 ppb | 7346 | 11820 |

Figure 7A:
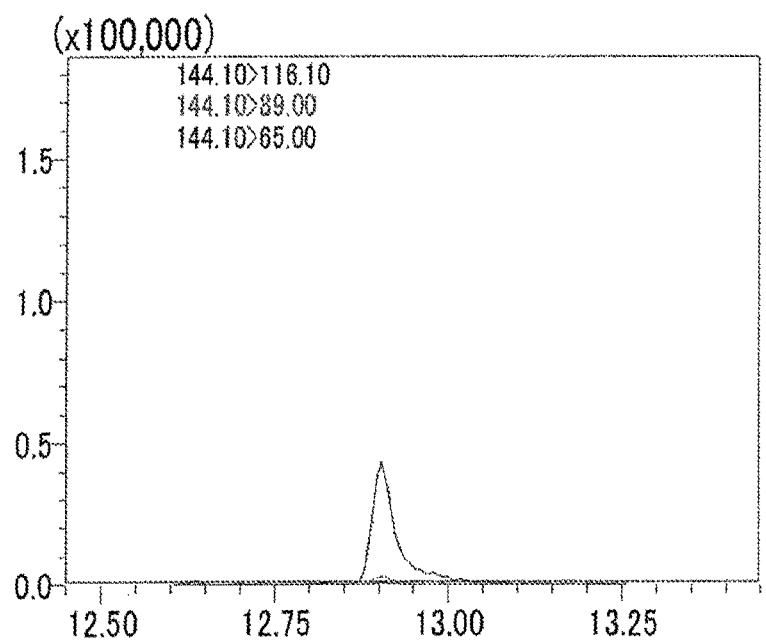
FIG. 7A is a graph showing a peak shape where only carbaryl (5 ppb) is injected.
Figure 7B:
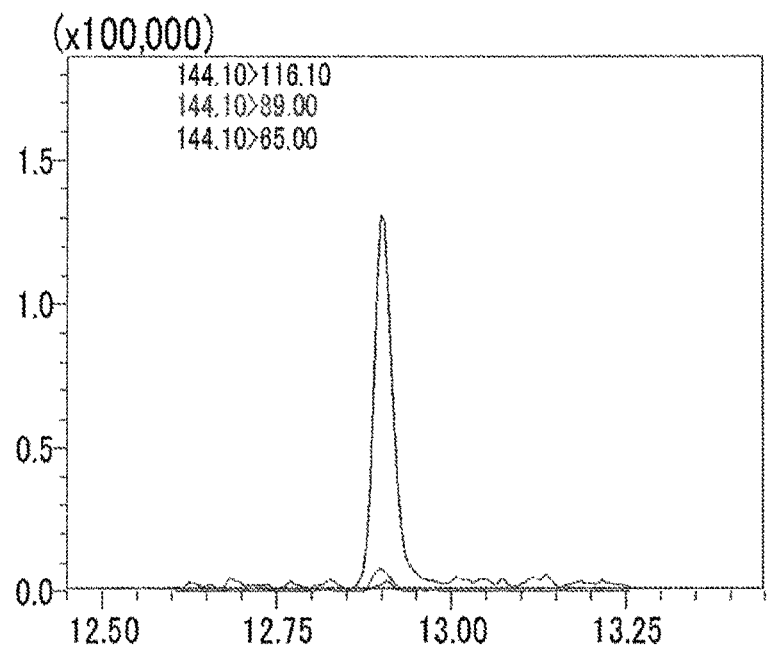
FIG. 7B is a graph showing a peak shape where carbaryl (5 ppb) and a pseudo matrix solution are simultaneously injected.

FIG. 7A is a graph showing a peak shape where only carbaryl (5 ppb) was injected. FIG. 7B is a graph showing a peak shape where carbaryl (5 ppb) and the pseudo matrix solution were simultaneously injected. From these results, it was confirmed that the peak area value is greater and tailing is less likely to occur when the pseudo matrix solution is simultaneously injected, than in a case where only the pesticide standard sample is injected.

Figure 8A:
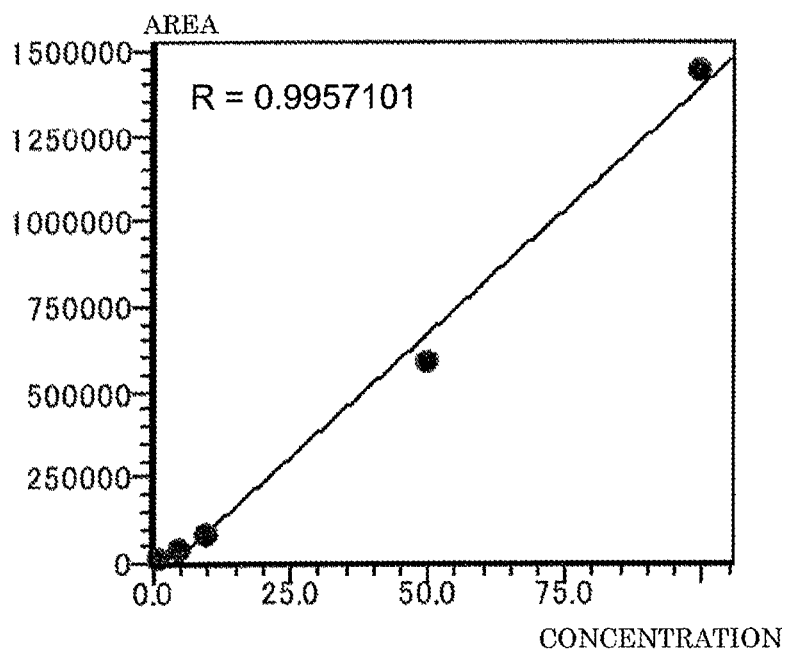
FIG. 8A is a diagram showing a calibration curve where only phosalone is injected.
Figure 8B:
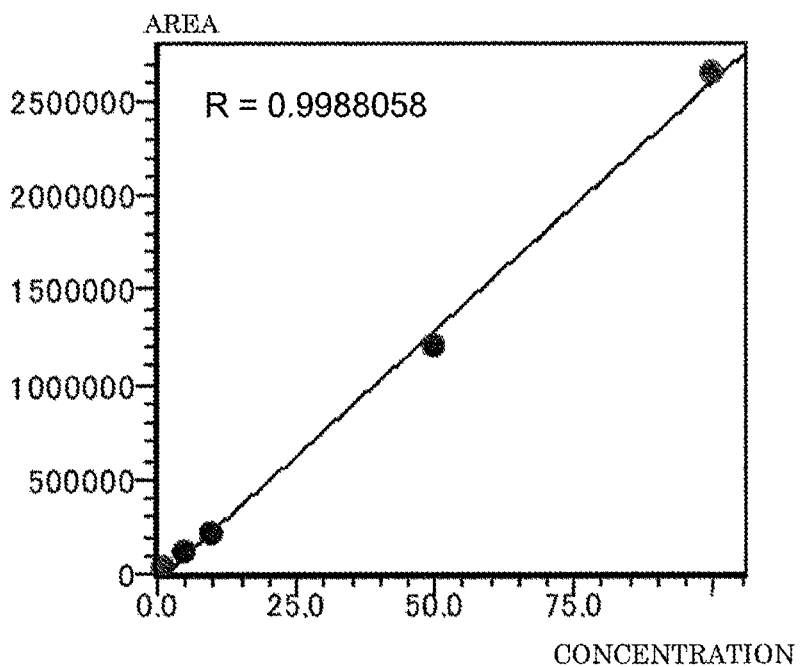
FIG. 8B is a diagram showing a calibration curve where only carbaryl is injected.
Figure 8C:
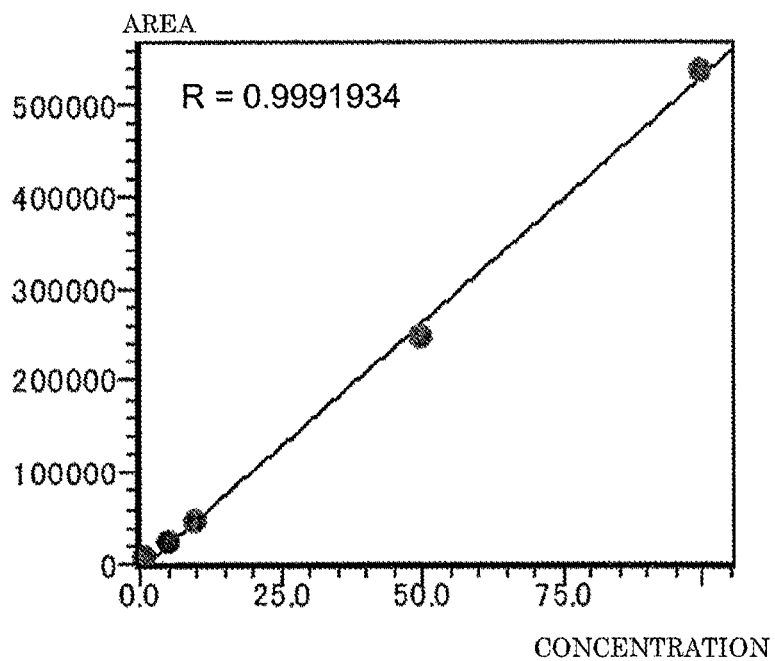
FIG. 8C a diagram showing a calibration curve where only delta-BHC is injected.
Figure 9A:
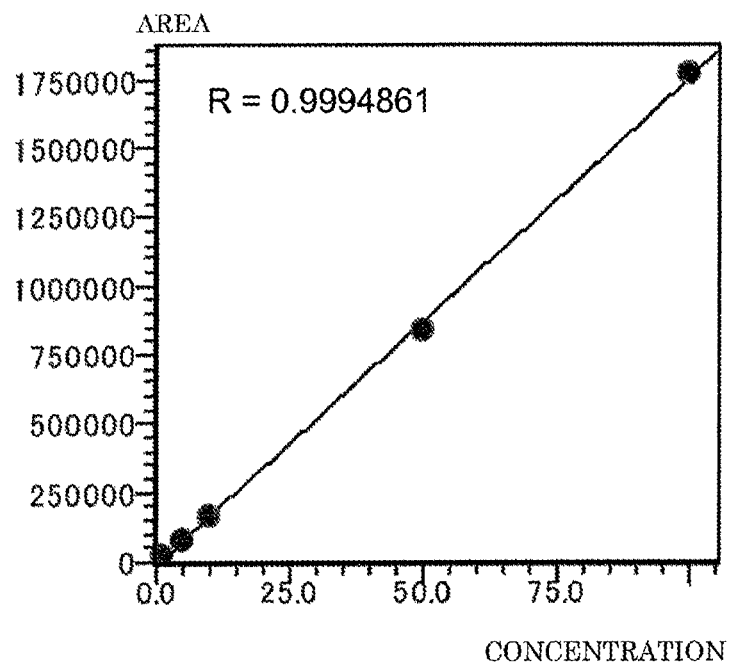
FIG. 9A is a diagram showing a calibration curve where phosalone and a pseudo matrix solution are simultaneously injected.
Figure 9B:
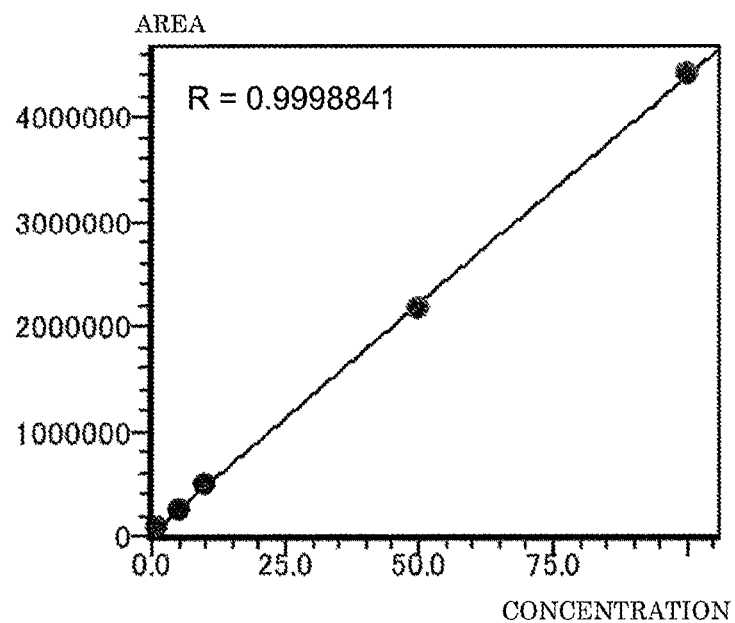
FIG. 9B is a diagram showing a calibration curve where carbaryl and a pseudo matrix solution are simultaneously injected.
Figure 9C:
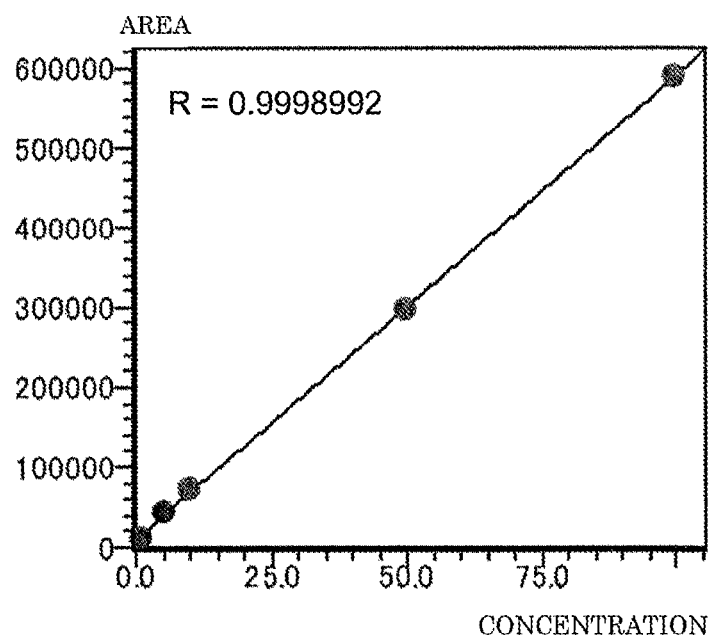
FIG. 9C is a diagram showing a calibration curve where delta-BHC and a pseudo matrix solution are simultaneously injected.

(3) Comparison of Calibration Curves Between Case of Injection of Only Pesticide Standard Sample and Case of Simultaneous Injection of Pseudo Matrix Solution A calibration curve for a case where only the pesticide standard sample was injected is shown in each of FIGS. 8A to 8C, where the pesticide standard samples were phosalone, carbaryl, and delta-BHC, respectively. A calibration curve for a case where the pseudo matrix solution was injected simultaneously with each of the pesticide standard samples mentioned above is shown in each of FIGS. 9A to 9C.

It can be confirmed that the calibration curve has higher linearity in the case where the pseudo matrix solution was simultaneously injected (FIGS. 9A to 9C) than in the case where only the pesticide standard sample was injected (FIGS. 8A to 8C). From these results, it can be seen that accurate quantitative values can be obtained by performing quantitative determination by the calibration curves in FIGS. 9A to 9C.

Figure 10:
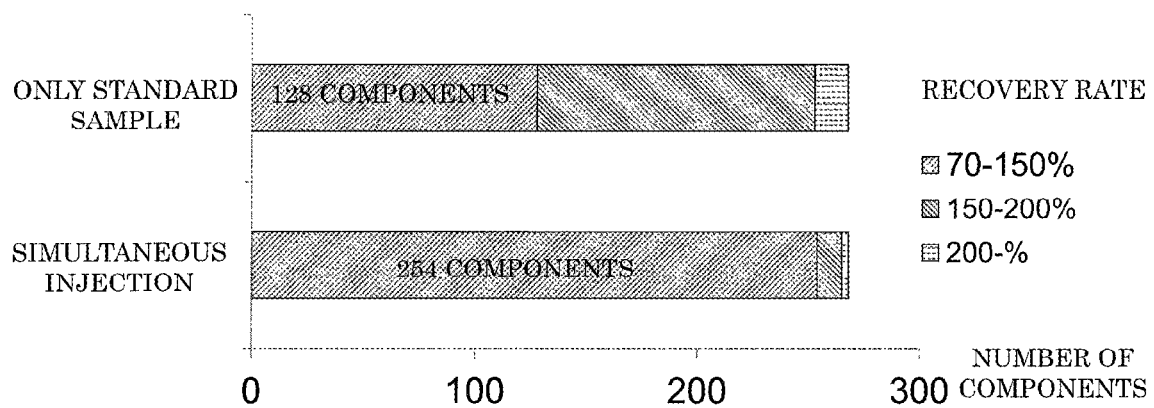
FIG. 10 is a diagram showing a recovery rate for a case where only a pesticide standard sample is injected and for a case where a pseudo matrix solution is simultaneously injected.

(4) Comparison of Recovery Rates Between Case of Injection of Only Pesticide Standard Sample and Case of Simultaneous Injection of Pseudo Matrix Solution FIG. 10 is a diagram showing a recovery rate for a case where only the pesticide standard sample was injected and for a case where the pseudo matrix solution was simultaneously injected. As shown in FIG. 10, in the case of injection of only the pesticide standard sample, the number of pesticides with the recovery rates ranging from 70% to 150% is 128 components among the total of 268 components, but in the case of simultaneous injection of pseudo matrix solution, the number of pesticides with the recovery rates ranging from 70% to 150% is 254 components among the total of 268 components.

Figure 11:
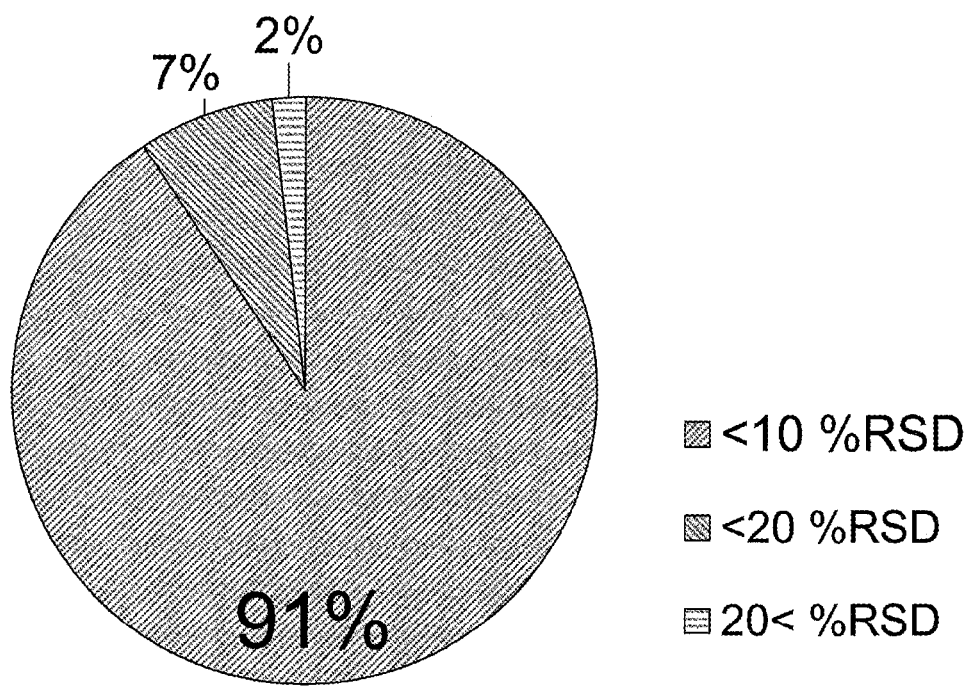
FIG. 11 is a diagram showing repeated analysis accuracy for a case where a pseudo matrix solution is simultaneously injected in a test sample.

(5) Repeated Analysis Accuracy for Case of Simultaneously Injecting Pseudo Matrix Solution in Test Sample FIG. 11 is a diagram showing repeated analysis accuracy for a case where the pseudo matrix solution was simultaneously injected in the test sample. As shown in FIG. 11, 243 components among the total of 268 components are components with relative standard deviation less than 10% RSD, and it can be confirmed that such components occupy 91% of all the components. From this result, it can be seen that simultaneous injection of the pseudo matrix enables quantitative values with small variations to be obtained.

DESCRIPTION OF REFERENCE SIGNS

1 GC unit (gas chromatograph unit)
2 MS unit (mass spectrometer unit)
11 column
12 sample vaporization chamber
13 column oven
14 AFC
15 syringe
16 syringe drive unit
17 first storage section
18 second storage section
19 control unit
21 sample solution
22 pseudo matrix solution
23 solution
24 air layer
191 suction control unit
192 injection control unit
193 flow rate control unit
194 analysis control unit

The invention claimed is:

1. A gas chromatograph for injecting a sample from a syringe into a sample vaporization chamber connected to a column and introducing a sample vaporized in the sample vaporization chamber into the column, the gas chromatograph comprising:
a first storage section for storing a sample solution that is a first solvent containing a sample;
a second storage section for storing a pseudo matrix solution that is a second solvent, with higher polarity than the first solvent, in which a pseudo matrix is dissolved;
a suction control unit for causing the sample solution in the first storage section and the pseudo matrix solution in the second storage section to be sucked into the syringe; and
an injection control unit for causing the sample solution and the pseudo matrix solution to be vaporized in the sample vaporization chamber, by causing the sample solution and the pseudo matrix solution sucked into the syringe to be injected into the sample vaporization chamber,
wherein the suction control unit is configured to cause the pseudo matrix solution in the second storage section to be sucked into the syringe, after causing the sample solution in the first storage section to be sucked into the syringe; and
wherein the injection control unit is configured to cause the sample solution in the syringe to be injected into the sample vaporization chamber after a lapse of a certain period of time after causing the pseudo matrix solution in the syringe to be injected into the sample vaporization chamber, wherein the certain period of time is a period of time set so that an analysis target substance is vaporized and introduced into the column after the pseudo matrix is vaporized and is sufficiently bound to an active site.

2. A sample injection method for injecting a sample from a syringe into a sample vaporization chamber connected to a column, the method comprising:
a suction step of sucking, into the syringe, a sample solution that is a first solvent containing a sample and a pseudo matrix solution that is a second solvent, with higher polarity than the first solvent, in which a pseudo matrix is dissolved; and
an injection step of causing the sample solution and the pseudo matrix solution to be vaporized in the sample vaporization chamber, by injecting the sample solution and the pseudo matrix solution sucked into the syringe into the sample vaporization chamber,
wherein, in the suction step, the pseudo matrix solution in the second storage section is sucked into the syringe, after the sample solution in the first storage section is sucked into the syringe; and
wherein, in the injection step, the sample solution in the syringe is injected into the sample vaporization chamber after a lapse of a certain period of time after the pseudo matrix solution in the syringe is injected into the sample vaporization chamber, wherein the certain period of time is a period of time set so that an analysis target substance is vaporized and introduced into the column after the pseudo matrix is vaporized and is sufficiently bound to an active site.

* * * * *